Aug. 4, 1931.  R. MASQUELIER  1,817,088
FRICTION SHOCK ABSORBER FOR SUSPENDING VEHICLES
Filed Aug. 31, 1929  2 Sheets-Sheet 1
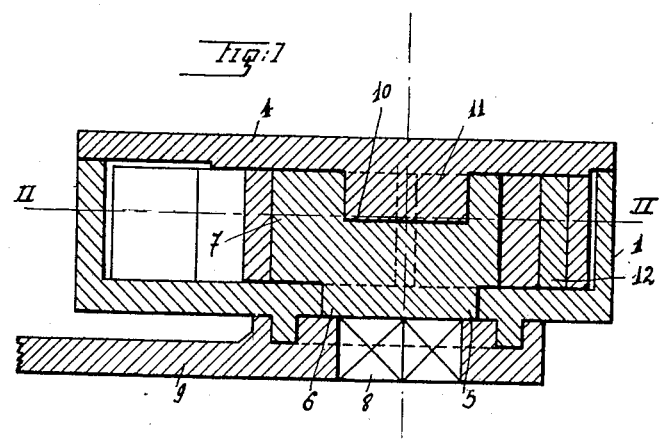
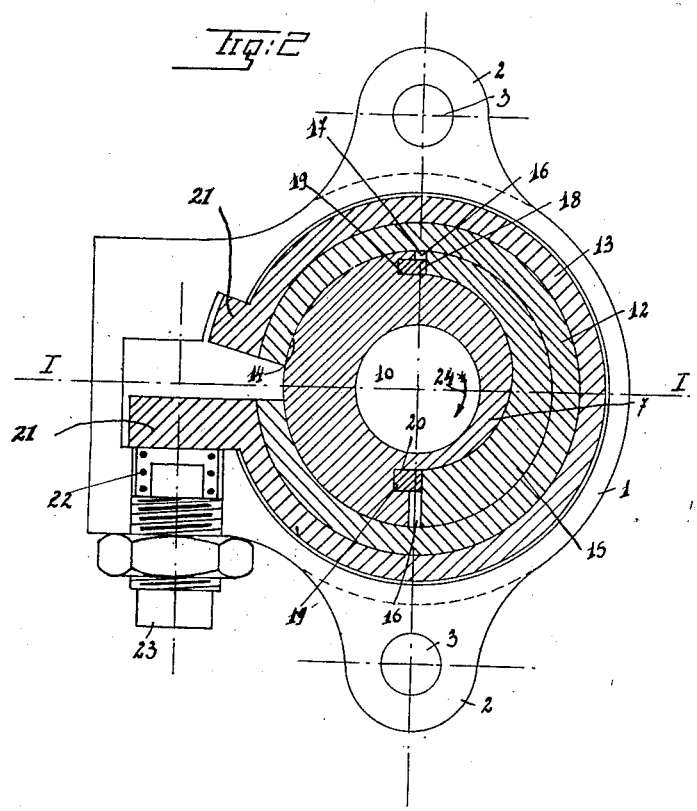
INVENTOR:
ROGER MASQUELIER
BY Ruege, Boyce & Bakelar
ATTORNEYS.

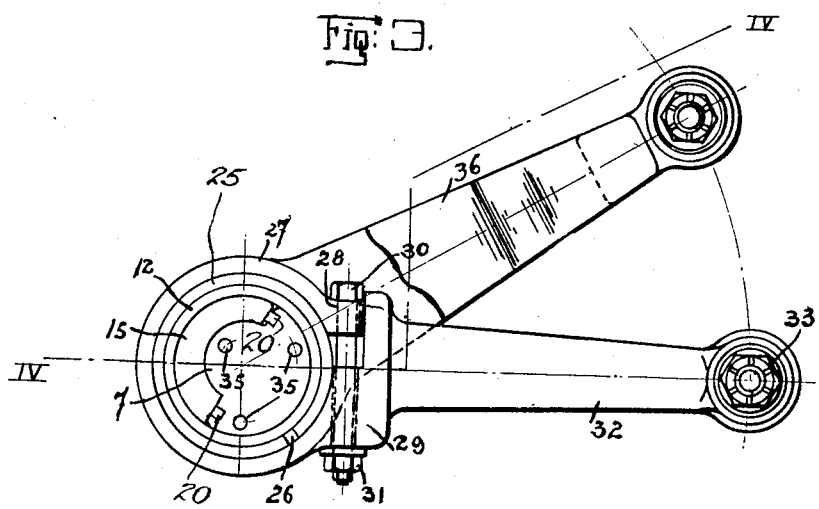
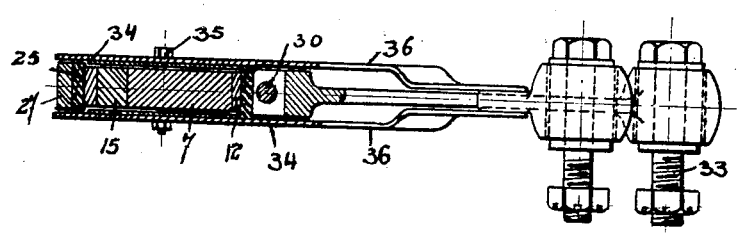

Patented Aug. 4, 1931

1,817,088

UNITED STATES PATENT OFFICE

ROGER MASQUELIER, OF TIRLEMONT, BELGIUM

FRICTION SHOCK ABSORBER FOR SUSPENDING VEHICLES

Application filed August 31, 1929, Serial No. 389,642, and in Belgium September 5, 1928.

This invention relates to a shock absorber for vehicles of the kind in which an eccentric, taking part in the displacements of the axle with respect to the chassis produces at first on a friction band a friction which increases gradually, during the first portion of the rotation of the eccentric following a relative displacement of the frame and of the axle and then a friction which remains constant during the rest of the stroke.

It has for its object to allow this braking in both directions to be variable and of unequal and variable amount and to eliminate any long and difficult machining of the parts.

With this object in view the invention essentially consists in the special arrangements and combinations of parts hereinafter fully described and pointed out in the appended claims.

On the annexed drawings:

Fig. 1 is a transverse section of a shock absorber, taken along the line I—I of Fig. 2.

Fig. 2 is a sectional view taken on the line II—II of Fig. 1.

Fig. 3 is a side elevation, partly broken away, of a modified construction of shock absorber, with the cover plate removed therefrom.

Fig. 4 is a sectional view taken approximately on the line IV—IV of Fig. 3.

As shown in Figs. 1 and 2, in the preferred construction, the apparatus comprises a housing or box 1 forming lugs 2 provided with holes 3 for securing the box to the axle of the vehicle. The box is closed at the back, by a cover-plate 4 and has at the front an opening 5 in which passes a journal 6 which is integral with an eccentric 7 and ends in a square portion 8 on which is mounted the lever 9 connected to the chassis of the vehicle. In this example, the eccentric 7 has in its side a recess 10 used for centering it upon a boss 11 of the cover-plate 4. Inside the box 1 is placed a friction band 12 housed inside a brake band 13.

The eccentric 7 is constructed in such a way as to have a circular surface 14 which comes in contact with a portion (for example one half) of the internal periphery of the friction band 13 while it acts upon the other portion of the latter by means of a single cam 15 the internal surface of which is continuous, that is to say is not provided with any notch co-operating with any projecting part of the eccentric. In this construction, in order to limit the expansive action of the eccentric 7 on the cam 15 when it rotates in the direction of the arrow (Fig. 2) a space 16 is left free between the flat faces 17 of the circular portion of the eccentric and the flat face 18 of the cam 15. Besides, the flat surfaces of the eccentric coming in contact with the flat surfaces of the cam are provided with a recess 19 in which is placed an elastic material 20 which is always in contact with the flat face of the cam. The brake band is provided at one of its ends with two lugs 21 on one of which a spring 22 acts, the compression of which can be adjusted by a nut 23. As will be easily understood, when the box 1 is fixed to the axle of the vehicle by means of bolts passing through the holes 3, and when the lever 9 is fixed to the chassis, if the axle tends to come nearer the latter and if the spring 22 is adjusted so that it is tightened as far as possible, the eccentric 7, when it turns in the direction opposite to that of the arrow 24, exerts, in the example shown, a braking action upon one half of the friction band 12 by means of the circular surface 14, while it is without action on the cam 15.

If the suspension of the vehicle tends to rebound, the lever 9 as it rises, causes rotation of the eccentric in the direction indicated by the arrow 24. Owing to this, the working surface of the eccentric exerts a braking action upon the corresponding half of the friction band by means of its circular surface, but it acts also by its eccentric portion upon the cam 15 which comes in contact with the other half of the internal periphery of the friction band, which causes a progressive braking action upon this portion of the band. This progressive braking action is, however, limited owing to the fact that, after a certain displacement of the eccentric 7 in the direction of the arrow 24 the flat faces 17 of the eccentric come in contact with the flat face 18 of the cam and cause the latter to participate in the circular motion thereby producing a braking action along the whole friction surface. As can readily be understood, the shock absorber described has in this case the advantage not only of decreasing the cost of production owing to the greater machining facility, but, besides, it also produces a friction, and therefore a braking action, whatever may be the direction of the relative displacement of the chassis and of the axle.

Instead of using for controlling the strength of the friction, a spring 22, the compression of which can be adjusted by a nut, a rubber band 25 may be utilized (Figs. 3 and 4) concentrically arranged with respect to the friction band 12 and coming into contact with the external periphery of the latter.

Between the ends of said rubber band, a free space 26 is left. In this case the brake band can be omitted; the rubber band 25 is however surrounded by a casing 27 which forms lugs 28 and 29 connected by a bolt 30 provided with a nut 31. One of the lugs, for instance the lug 29, is extended to form a lever 32 for connection with the axle 33 of the vehicle by any suitable means.

It will be understood that the distance between the lugs 28 and 29 can be modified at will by means of the nut 31 and that consequently the tension of the rubber band 25 can also be varied, the ends of which can come nearer to one another, owing to the presence of the free space 26. Moreover the unit formed by the eccentric 7, the cam 15, the friction band 12, the rubber band 25 and the casing 27, is covered laterally by circular plates 34 connected by means of screws 35 to the eccentric 7.

Said plates 34 are provided with levers 36 forming prolongations and connected together and also to the chassis by any suitable means.

What I claim is:

1. In a shock absorber for vehicles, in combination a circular housing, a circular friction band inside the housing, an eccentric arranged inside the said friction band and provided with a circular surface coming into contact with substantially one half of the internal periphery of the friction band, a cam, the internal surface of which is continuous and arranged between the eccentric and the remaining portion of the friction band, means whereby the said eccentric is rotated and means whereby the cam is rotated during only a part of the rotation of the eccentric.

2. In a shock absorber for vehicles, in combination, a circular housing, a circular friction band inside the housing, an eccentric arranged inside the said friction band and provided with a circular surface coming into contact with substantially one half of the internal periphery of the friction band, a cam, the internal surface of which is continuous and arranged between the eccentric and the remaining portion of the friction band, means whereby the said eccentric is rotated, means whereby the cam is rotated during only a part of the rotation of the eccentric and means whereby the diameter of the said housing is adapted to be adjusted.

3. In a shock absorber for vehicles, in combination, a circular housing, a circular friction band inside the housing, an eccentric arranged inside the said friction band and provided with a circular surface coming into contact with substantially one half of the internal periphery of the friction band, a cam, the internal surface of which is continuous and arranged between the eccentric and the remaining portion of the friction band, means whereby the eccentric is rotated, a space being left free between the flat faces of the cam and flat faces formed at the ends of the circular part of the eccentric whereby the cam is rotated during only a part of the rotation of the eccentric and means whereby the diameter of the housing is adapted to be adjusted.

4. In a shock absorber for vehicles in combination, a circular housing, a circular friction band inside the housing, an eccentric arranged inside the said friction band and provided with a circular surface coming into contact with substantialy one half of the internal periphery of the friction band, a cam, the internal periphery of which is continuous and arranged between the eccentric and the remaining portion of the friction band, means whereby the eccentric is rotated, means whereby the cam is rotated during a part of the rotation of the eccentric, an elastic band surrounding the friction band, lugs formed by the housing a bolt provided with a nut whereby the lugs are connected and the diameter of the housing is adapted to be modified and means whereby the housing is connected to the axle of the vehicle.

In testimony whereof I have affixed my signature.

ROGER MASQUELIER.